(12) United States Patent
Berscheid et al.

(10) Patent No.: US 8,411,733 B2
(45) Date of Patent: Apr. 2, 2013

(54) SIGNAL EQUALIZER FOR A SIGNAL TRANSMISSION NETWORK

(75) Inventors: Brian Berscheid, Saskatchewan (CA); Zohreh Andalibi, Saskatchewan (CA); Eric Salt, Saskatchewan (CA)

(73) Assignee: Vecima Networks Inc, Victoria, B.C. (CA)

(*) Notice: Subject to any disclaimer, the term of this patent is extended or adjusted under 35 U.S.C. 154(b) by 140 days.

(21) Appl. No.: 12/815,611

(22) Filed: Jun. 15, 2010

(65) Prior Publication Data
US 2010/0316111 A1 Dec. 16, 2010

Related U.S. Application Data

(60) Provisional application No. 61/187,362, filed on Jun. 16, 2009.

(51) Int. Cl.
*H03H 7/30* (2006.01)

(52) U.S. Cl. ........ 375/232; 375/224; 375/229; 375/230; 375/231; 375/233; 375/346; 375/350; 333/18; 333/28 R; 708/300

(58) Field of Classification Search ............... 375/224, 375/229, 230, 231, 232, 233, 346, 350; 333/18, 333/28 R; 708/300
See application file for complete search history.

(56) References Cited

U.S. PATENT DOCUMENTS

| 2003/0021365 | A1* | 1/2003 | Min et al. ............... 375/343 |
| 2003/0031275 | A1* | 2/2003 | Min et al. ............... 375/326 |
| 2003/0081670 | A1* | 5/2003 | Bologna et al. ......... 375/234 |
| 2004/0190649 | A1* | 9/2004 | Endres et al. ........... 375/326 |
| 2005/0185743 | A1* | 8/2005 | Li ........................... 375/350 |
| 2007/0030890 | A1* | 2/2007 | Yamaguchi .............. 375/233 |

* cited by examiner

*Primary Examiner* — Leon Flores
(74) *Attorney, Agent, or Firm* — Adrian D. Battison; Ade & Company Inc (57) ABSTRACT

In an RF signal transmission network such as the reverse channels of a coaxial cable network, there is provided at least one adaptive equalizer for pre- or post-filtering inter-symbol interference in the transmitted signals, the adaptive equalizer having a series of coefficients for which values are required. In order to improve the transmission efficiency the preamble used in these channels is shortened by coarsely estimating the channel using a short "unique word" placed at the beginning of the equalizer training sequence. The coarse channel estimate is crudely inverted to produce a set of equalizer coefficients which partially equalize the channel. By initializing the adaptive equalizer with these approximate coefficients, it is possible to reduce the length of the training sequence needed for the equalizer to converge.

22 Claims, 13 Drawing Sheets

Fig. 13

SIGNAL EQUALIZER FOR A SIGNAL TRANSMISSION NETWORK

This application claims priority under 35 U.S.C. 119 from United States Provisional Application Serial No. 61/187,362 filed Jun. 16, 2009.

This invention relates to a method for obtaining the required coefficients for the equalizer used in an RF signal transmission network for transmitting symbols where the network includes an RF transmission medium for transmitting the symbols modulated to a transmission format and at least one adaptive equalizer for filtering inter-symbol interference in the transmitted signals, the adaptive equalizer having a series of coefficients for which values are required.

BACKGROUND OF THE INVENTION

Originally, co-axial cable networks were designed to be one-to-many distribution systems. Later, without changing the in-ground cable plant, the system was modified to accommodate communication in the reverse or upstream direction. The legacy is a system with upstream channels that are noisy, echo-laden, and unique to each user.

Figure 1:
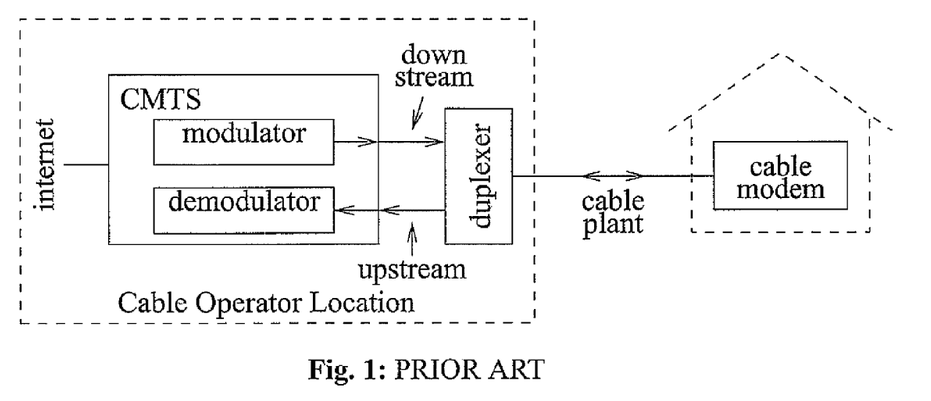
FIG. 1 is a schematic illustration of an overview of a cable transmission system including a Cable Modem Termination System (CMTS) for controlling data transmission between an head end and a series of subscriber premises.

Two-way transmission of data over coaxial cable requires a modulator and demodulator (modem) at each end. The modem in the subscriber's residence is called the cable modem. The modem in the cable operator's premises (head end) is part of a larger piece of equipment called the Cable Modem Termination System (CMTS). The modem in the CMTS is referred to as the CMTS modem. An overview of a typical coaxial cable network is provided in FIG. 1.

DOCSIS, which is an acronym for Data Over Cable Service Interface Specification, is an international family of standards developed by CableLabs. The DOCSIS standards govern the operation of both the upstream and down-stream cable channels. In this document, it is the upstream channel that is of interest. The DOCSIS standard allows the CMTS to partition and allocate the spectrum reserved for upstream channels as well as define the packet preamble, packet payload and modulation format on a per-user basis.

The upstream cable channel, as described in the DOCSIS standard, is echo-laden and unique to each user. DOCSIS specifies that each cable modem should pre-equalize its upstream transmissions using a 24-tap linear equalizer. It is the responsibility of the CMTS to determine the required pre-equalizer tap values during the initialization process and to send these values to the cable modems via the down-stream channel. The CMTS demodulator determines the pre-equalizer coefficients for each user of the upstream channel through the use of an adaptive equalizer.

Figure 2:
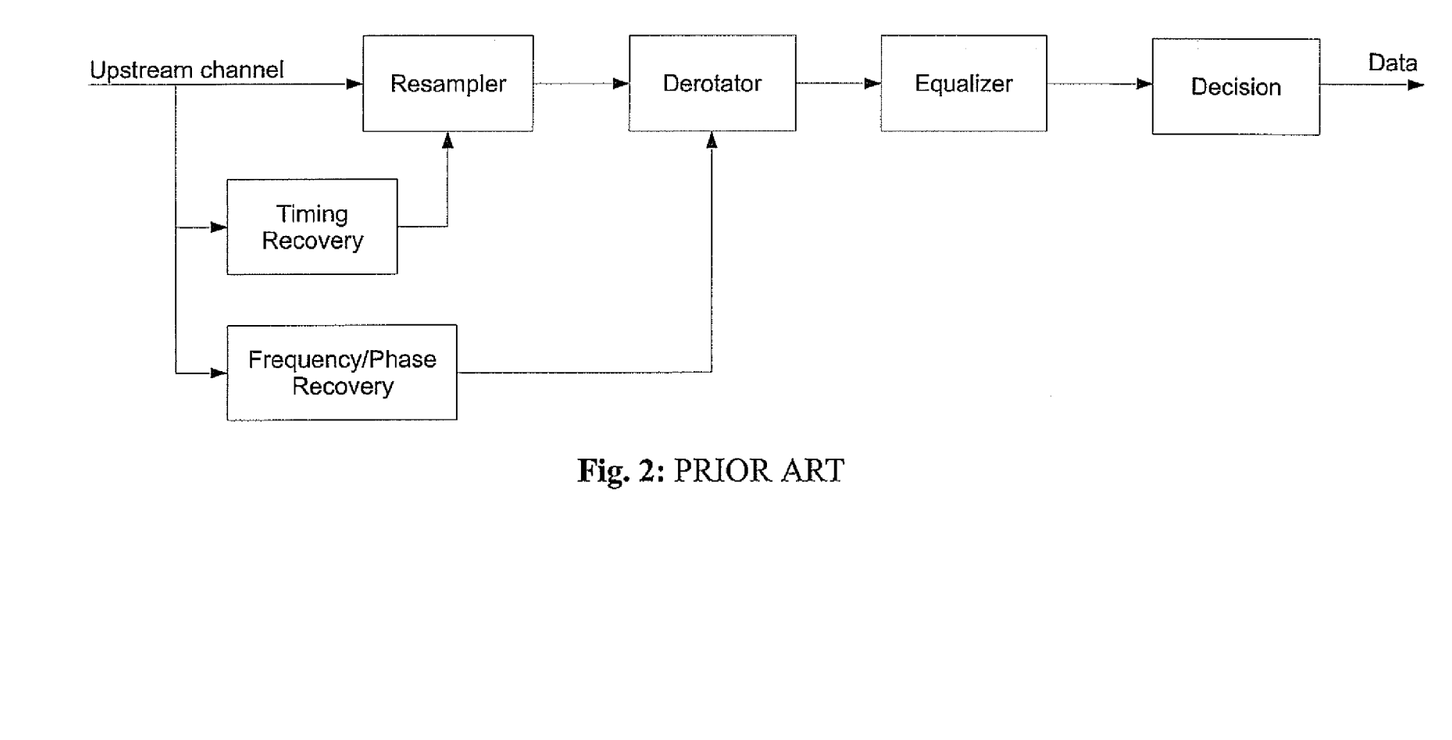
FIG. 2 is a block diagram of a typical demodulator for upstream cable signals.

One possible structure for the upstream demodulator is shown in FIG. 2. In the demodulator of FIG. 2, a known preamble sequence is used to train the adaptive equalizer and recover symbol timing, carrier frequency, and phase on a packet-by-packet basis. Since training the equalizer is the most difficult of these functions, the total required preamble length for the upstream packets is largely determined by the convergence time of the equalizer. The tap weights of the adaptive equalizer are commonly updated using an error-driven stochastic descent algorithm, such as the Least Mean Squares (LMS) algorithm. Unfortunately, such algorithms tend to converge relatively slowly, necessitating a long training sequence. A lengthy training sequence is undesirable, as it adds considerable overhead to the upstream channels.

SUMMARY OF THE INVENTION

Figure 3:
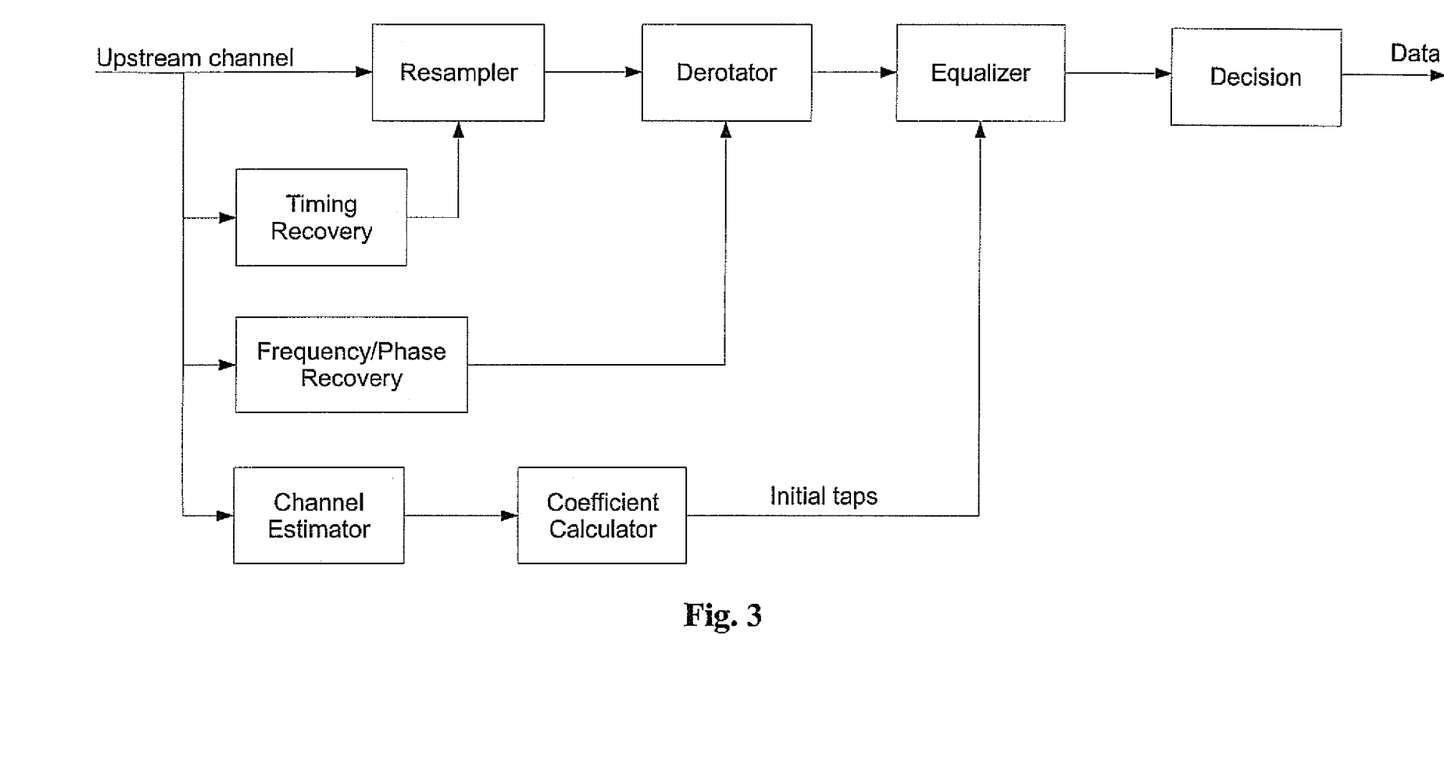
FIG. 3 is a block diagram of a modified demodulator for upstream cable signals which utilizes the proposed initialization technique.

The objective of this invention is to improve the efficiency of the reverse channels by shortening the preamble used in these channels. This is achieved by coarsely estimating the channel using a short "unique word" placed at the beginning of the equalizer training sequence. The coarse channel estimate is crudely inverted to produce a set of equalizer coefficients which partially equalize the channel. By initializing the adaptive equalizer with these approximate coefficients, it is possible to reduce the length of the training sequence needed for the equalizer to converge. The shorter preamble reduces the overhead in the packets and increases the efficiency of the reverse channel. FIG. 3 shows the structure of one potential demodulator which utilizes this technique.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

ISI Equivalent Model for Time Reverse Channel

The upstream cable channel often contains a number of echoes due to impedance mismatches in the cable plant. DOCSIS specifies the strength of these echoes as a function of the delay. The echo strength can be as high as −10 dBc for delays up to 0.5 μs, −20 dBc for delays between 0.5 and 1 μs and −31.5 dBc for delays greater than 1 μs.

Figure 4:
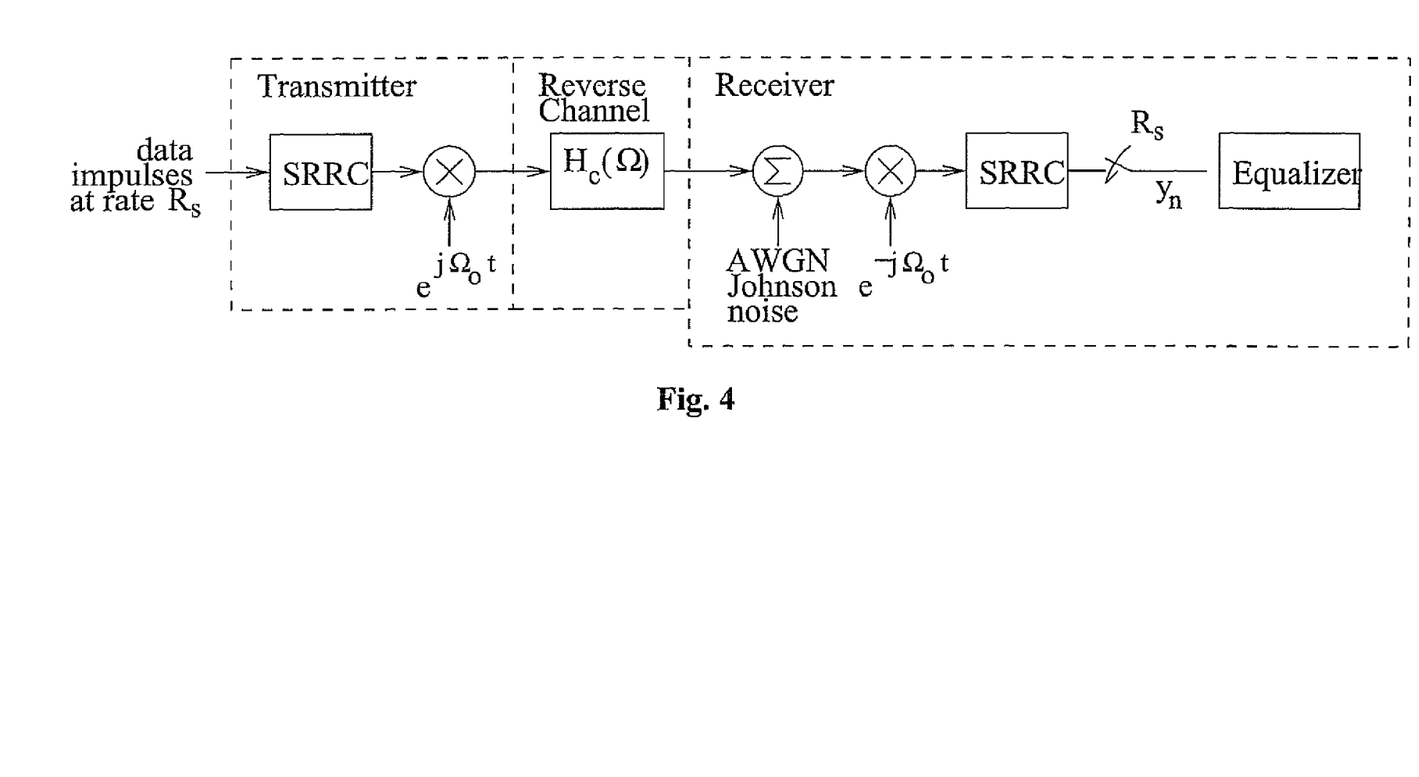
FIG. 4 is a block diagram showing the end to end system for modelling the transmission system to obtain the required coefficients for the equalizer.

A block diagram for the end-to-end system is shown in FIG. 4. The input to the system is a sequence of complex impulses (Dirac delta functions) that are weighted by the value of the data. The output is a sequence of decision variables which are digital estimates of the weights.

Figure 5:
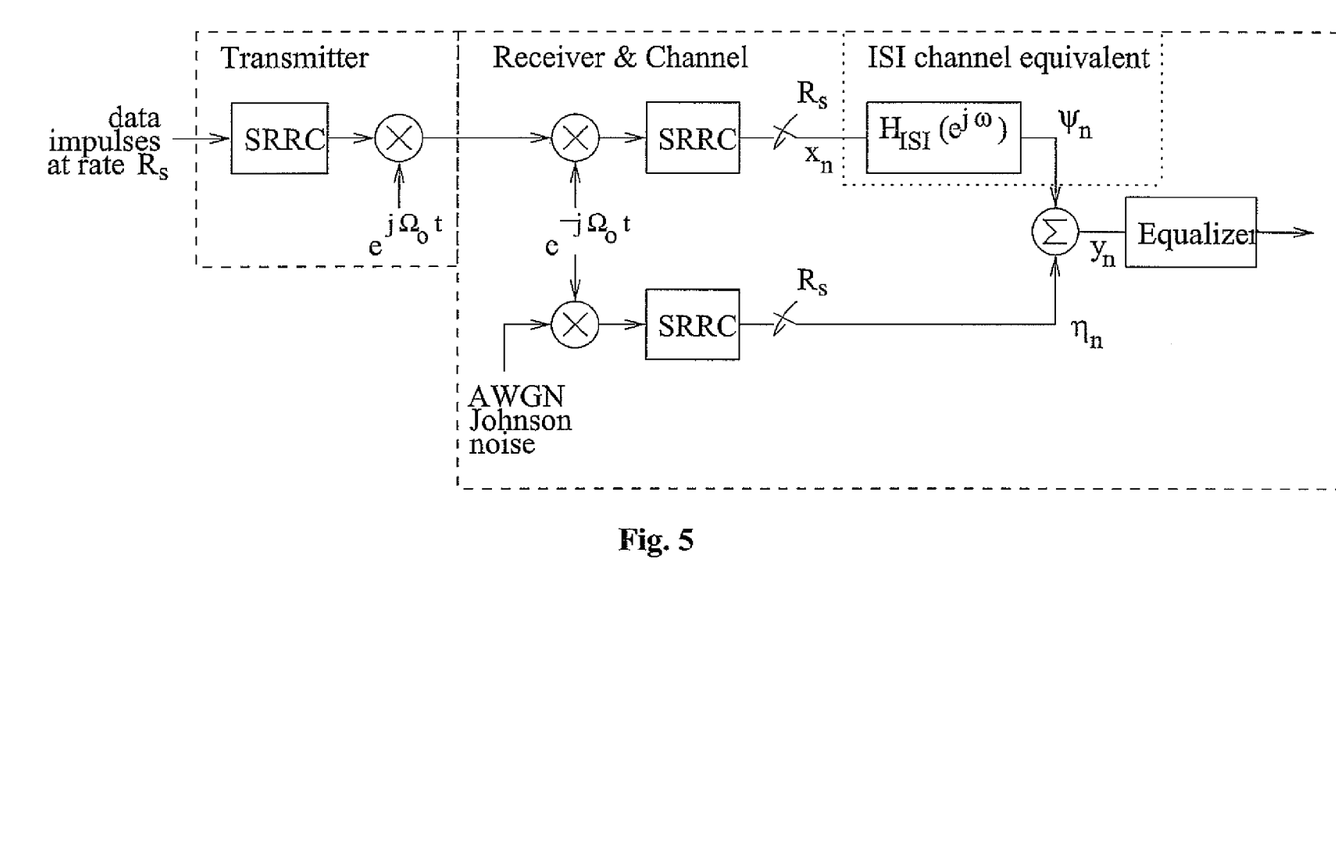
FIG. 5 is a block diagram of the model of the end to end system of FIG. 4.

For purposes of analysis, the system will be modelled as shown in FIG. 5. In the model, the reverse RF channel has been removed from its rightful location and placed (in a different form) inside the receiver. In the model, the channel is represented by a discrete time finite impulse response filter that runs at the symbol rate. It is placed after the square root raised cosine filter that is matched to the pulse shaping filter in the transmitter. Since the Johnson noise at the front end of the receiver does not go through the reverse RF channel, it is modeled as a separate path in the receiver and then added to the output of the channel equivalent filter.

Clearly, the ISI equivalent FIR filter does not model the impulse response of the analog RF channel. It models the inter-symbol interference caused by the reverse channel. The ISI equivalent filter is shown in FIG. 5 characterized by its frequency response, $H_{ISI}(e^{jw})$.

Figure 6:
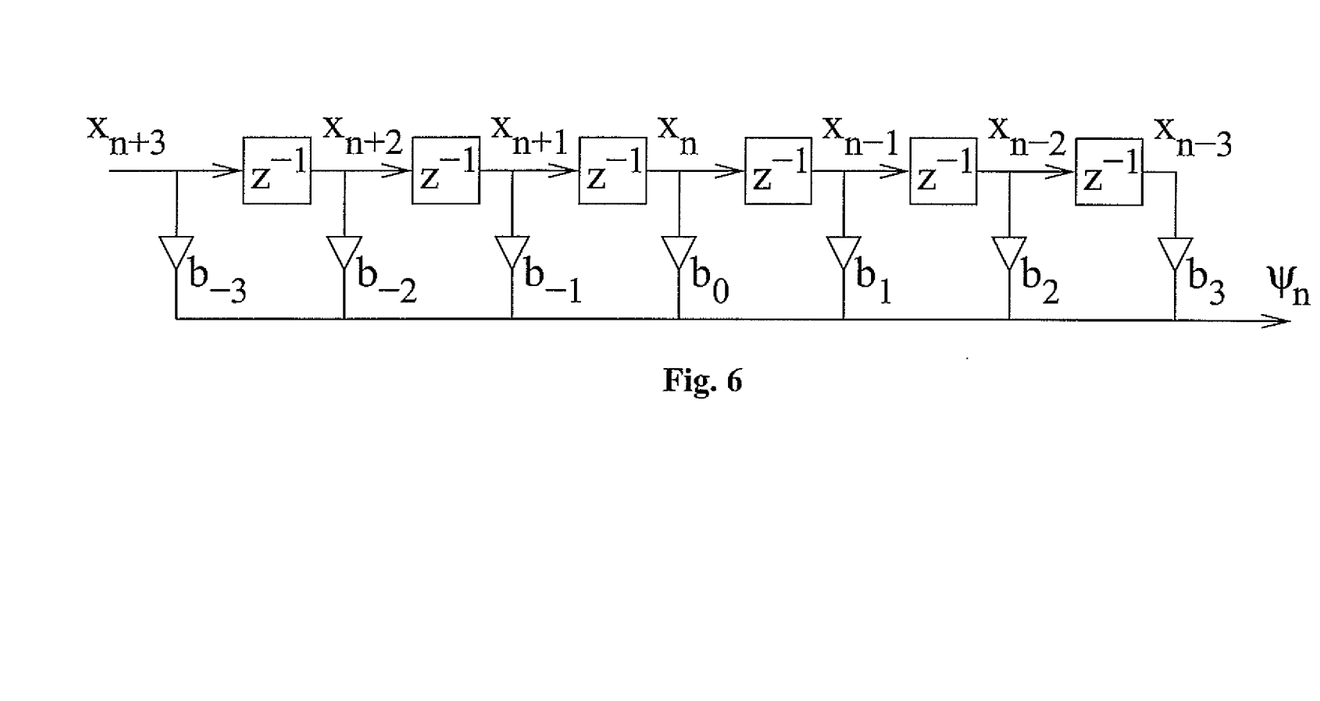
FIG. 6 is a block diagram of the ISI model for the reverse channel for use in the modelling system.

The architecture for the ISI equivalent filter is shown in FIG. 6. The filter is driven at the symbol rate, i.e. $z^{-1}$ is a delay of one symbol interval. The length of filter is the sum of the lengths of the impulse responses of the channel, the pulse shaping filter, and matched filter, all measured in symbol intervals. The coefficients for the filter are given by $h_{channel}(t) * h_{pulse\_shaping}(t) * h_{matched}(t)|_{t=t_o+nT}$ where $t_o+nT$ marks the times the output of the SRRC filter is sampled to get the decision variables. This is a causal filter, but is shown as a non-causal filter in FIG. 6 to simplify the notation. The input to the ISI equivalent filter is referred to as a sequence of pristine decision variables, which are the decision variables in the absence of channel distortion and Johnson noise. The output of the ISI equivalent filter, which is the pristine decision variables corrupted by channel distortion, is denoted $\psi_n$. The subscript n on all variables indicates time in symbols with respect to $t_o$. In the event the channel has no echoes, all coefficients except $b_0$ are zero and $b_0=1$. The output is then $\psi_n = x_n$.

Figure 7:
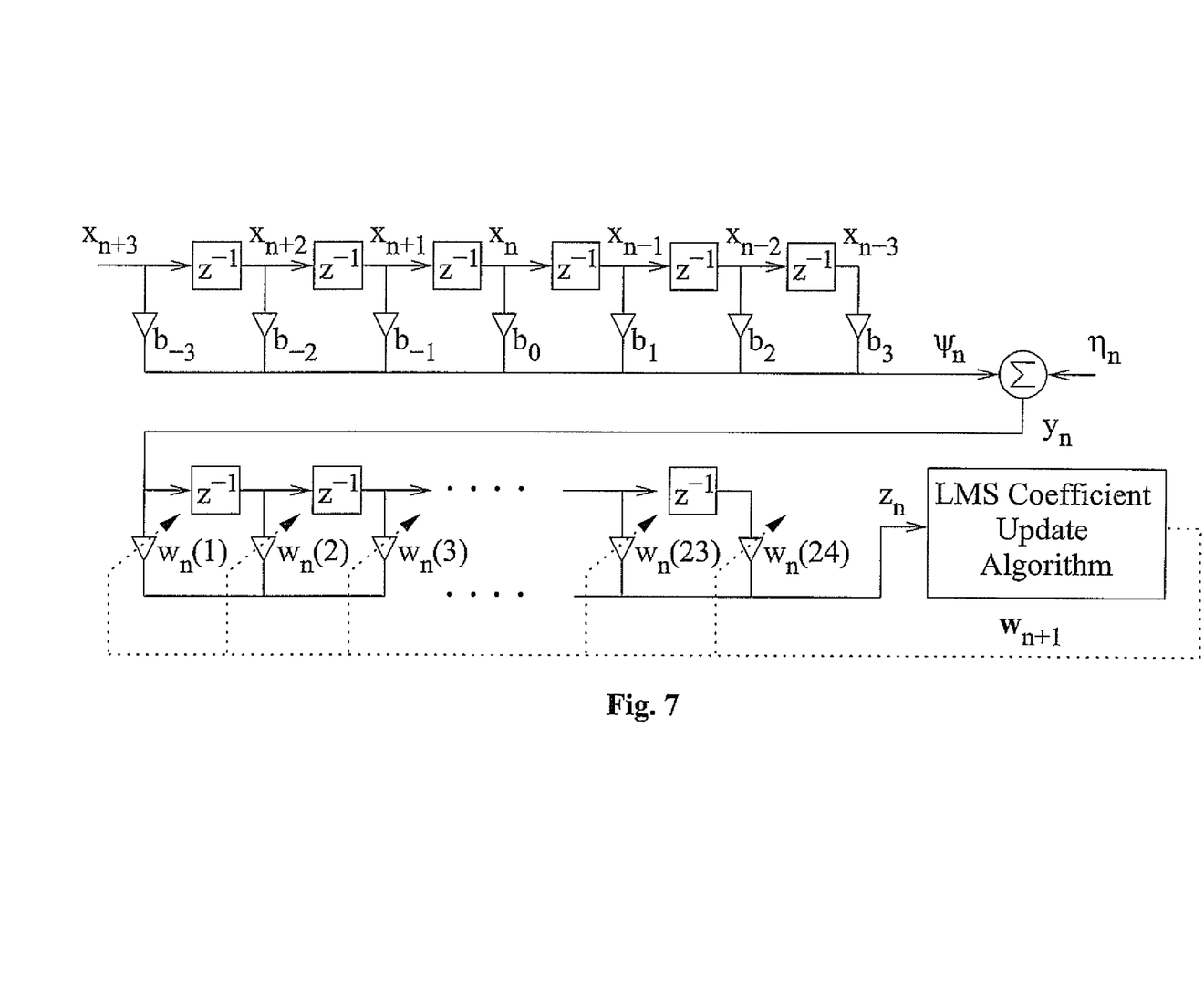
FIG. 7 is a block diagram of the reverse channel model and the adaptive equalizer of FIG. 5.

Ideally, the ISI modeled by the ISI equivalent filter is removed by the adaptive equalizer, which is itself a linear filter running at the symbol rate. FIG. 7 shows the structure of the adaptive equalizer along with the ISI equivalent filter.

Proposed Method to Seed the Equalizer

The filter coefficients can be determined by simple algebraic manipulation of an output sequence if the preamble is chosen properly. How this can be done is illustrated for a filter with 7 coefficients, which is the length of the filter shown in FIG. 6. The preamble used to excite the filter has only two values and so only two different symbols are transmitted during the preamble. The symbols transmitted must be such that the constellation points (i.e. pristine decision variables) are $\pm Ae^{j\theta}$, where A and $\theta$ are constants. Such symbols can be generated

TABLE I

Input and output sequences used to find the coefficients for the ISI equivalent model.

$x_0 = 1;$
$x_1 = 1;$
$x_2 = 1;$
$x_3 = 1; \psi_3 = \Sigma_{i=-3}^{3} b_i$
$x_4 = 1; \psi_4 = -2b_{-3} + \Sigma_{i=-3}^{3} b_i$
$x_5 = 1; \psi_5 = -2b_{-2} + \Sigma_{i=-3}^{3} b_i$
$x_6 = 1; \psi_6 = -2b_{-1} + \Sigma_{i=-3}^{3} b_i$
$x_7 = -1; \psi_7 = -2b_0 + \Sigma_{i=-3}^{3} b_i$
$x_8 = 1; \psi_8 = -2b_1 + \Sigma_{i=-3}^{3} b_i$
$x_9 = 1; \psi_9 = -2b_2 + \Sigma_{i=-3}^{3} b_i$
$x_{10} = 1; \psi_{10} = -2b_3 + \Sigma_{i=-3}^{3} b_i$
$x_{11} = 1;$ TABLE I-continued Input and output sequences used to find the coefficients for the ISI equivalent model.

$x_{12} = 1;$
$x_{13} = 1;$ from square M-QAM constellations of any order, including BPSK. Without loss of generality, for reasons of notational convenience A will be set to 1 and $\theta$ set to zero. With these values, the pristine decision variables take on values of $\pm 1$. A pristine decision variable sequence that can be used to compute the ISI equivalent filter coefficients is given in Table I.

Notice that all values in the input sequence $x_n$, are "+1" except $x_7$, it has value "−1". Also shown in Table I is the filter output sequence $\psi_n$ for n=3, 4, . . . , 10. The first valid output occurs at n=3, since the filter needs 3 past values to produce a valid output. The last valid output is at n=10, as the filter is non-causal and needs three future samples. At the time the filter has output $\psi_3$, it filled with +1 s. In this case $\psi_3 = \Sigma_{i=-3}^{3} b_i$ as indicated in Table I. When the pristine decision variable is $x_4$, $x_7$ aligns with coefficient $b_{-3}$. Since $x_7=-1$, output $\psi_4$ is different from $\psi_3$. The equation for $\psi_4$ is given in Table I. Outputs $\psi_5$, $\psi_6$ etcetera change as the "−1" shifts through the filter.

The ISI equivalent filter coefficients can be computed using equations:

$$b_{-3} = (\psi_3 - \psi_4)/2$$
$$b_{-2} = (\psi_3 - \psi_5)/2$$
$$\vdots$$
$$b_k = (\psi_3 - \psi_{k+7})/2$$

Figure 8:
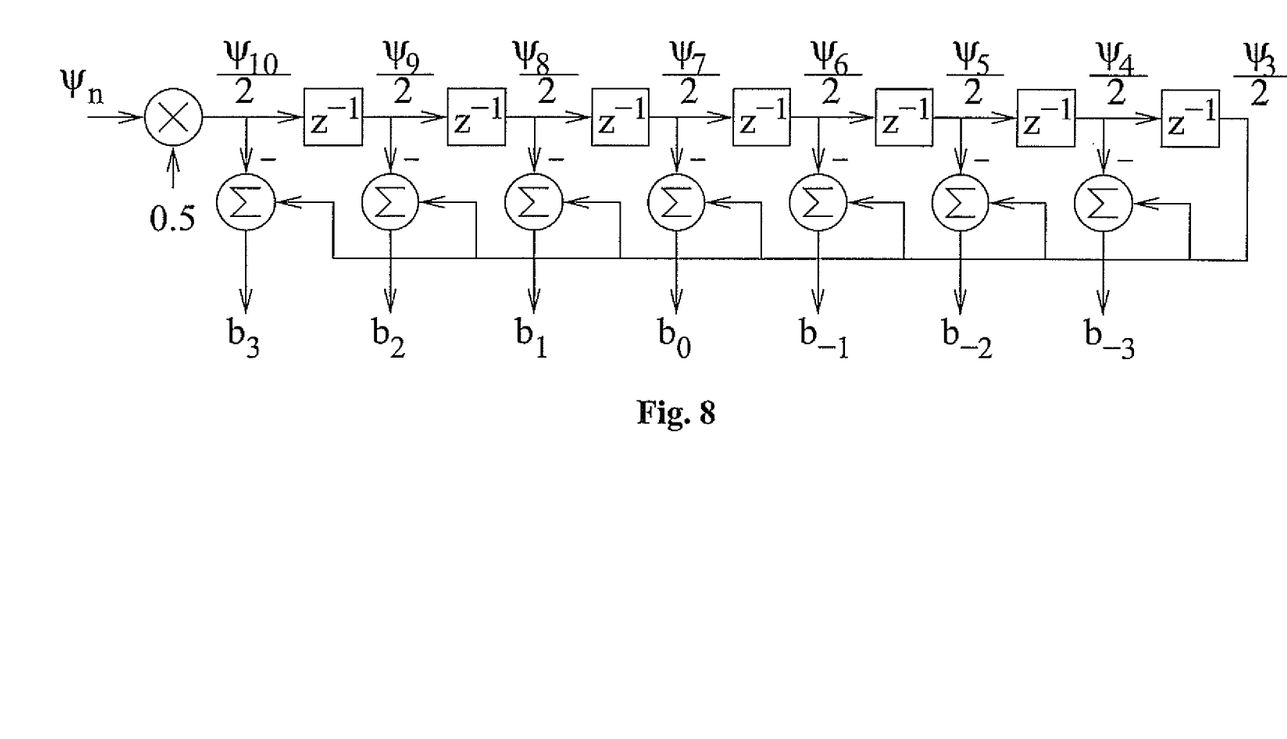
FIG. 8 is a block diagram of an apparatus for calculating the coefficients of the ISI equivalent reverse channel.

These equations can be implemented with the apparatus shown in FIG. 8.

Alternatively, the coefficients of the ISI equivalent filter may be estimated using the equations:

$$b_{-3} = \left(\sum_{i=4}^{10} \psi_i / 10\right) - \psi_4/2$$
$$b_{-2} = \left(\sum_{i=4}^{10} \psi_i / 10\right) - \psi_5/2$$
$$\vdots$$
$$b_k = \left(\sum_{i=4}^{10} \psi_i / 10\right) - \psi_{k+7}/2$$

Figure 9:
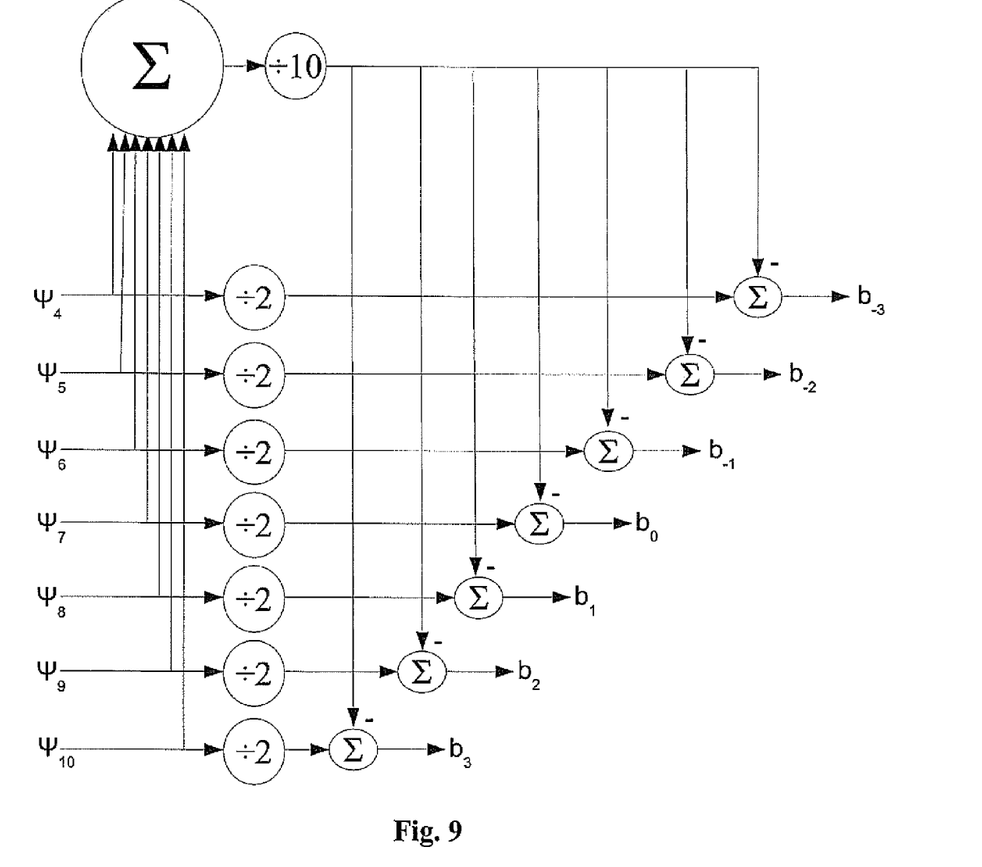
FIG. 9 is a block diagram of an alternative apparatus for calculating the coefficients of the ISI equivalent reverse channel.

An apparatus which implements these equations is shown in FIG. 9.

Initializing an Adaptive Equalizer

Obtaining the coefficients for the ISI equivalent filter is only the first step in the process of finding the coefficients of a filter (equalizer) that removes the ISI caused by the ISI equivalent filter. The coefficients of such an equalizer can be found from the coefficients of the ISI equivalent filter. However, the standard approach to doing so requires a matrix inversion that takes a very large number of mathematical operations. In practice this number of mathematical operations is often prohibitively large, which is one reason why adaptive equalizers are used in many applications. The approach that is taken here is to use the information in the ISI equivalent channel coefficients to initialize an adaptive equalizer with the aim of reducing the time it takes to converge. Of course, the number of mathematical calculations needed to compute the initial values must be reasonable.

The approach is to find the coefficients for an equalizer that partially equalizes the ISI equivalent filter. These coefficients are to be calculated from the ISI equivalent filter coefficients and to be done with relatively few mathematical operations. The guiding principle is to represent the ISI equivalent filter as two filters in parallel and then find the equalizer that equalizes one of them.

Figure 10:
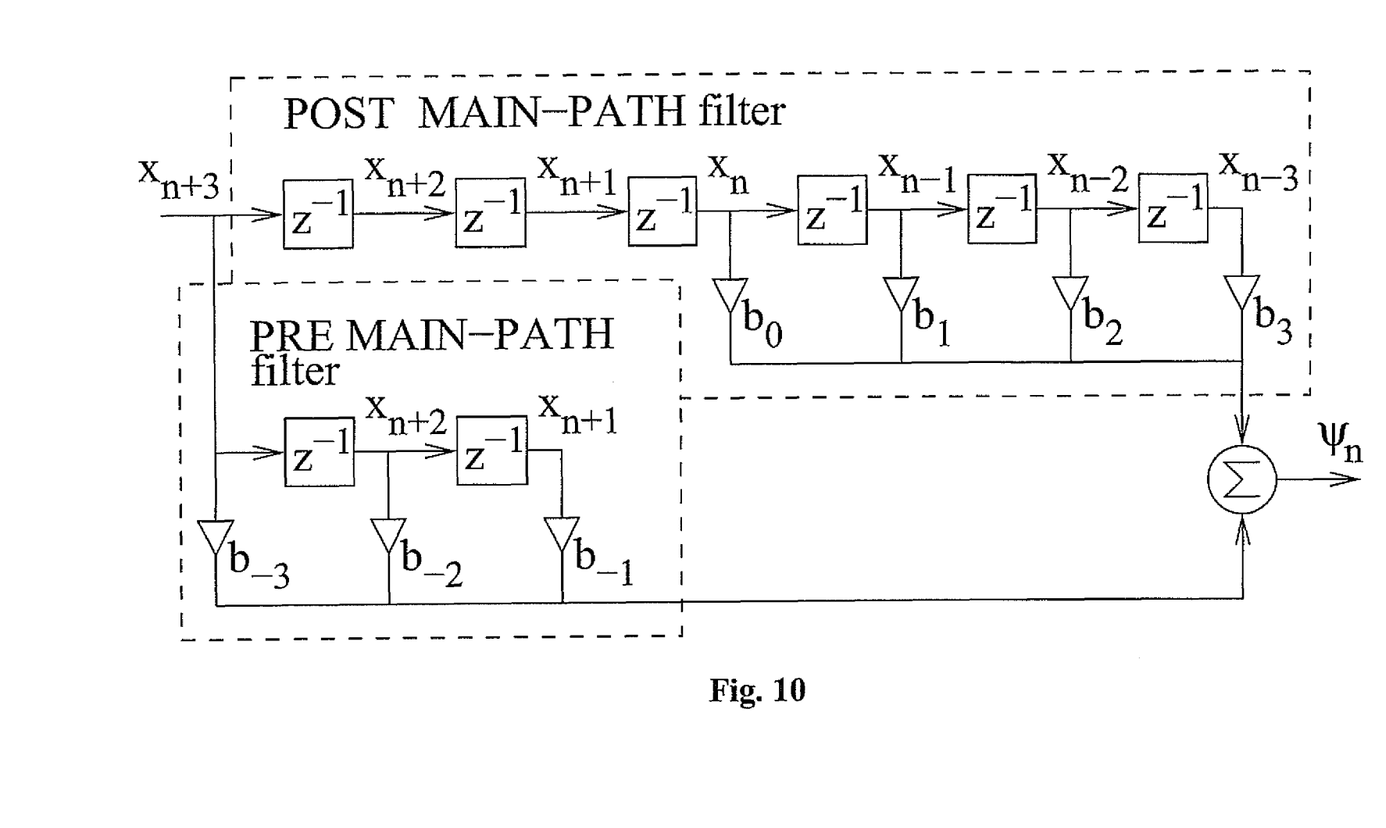
FIG. 10 is a block diagram showing the parallel representation of the ISI equivalent filter.

The ISI equivalent filter can be viewed as two filters in parallel with a common input and their outputs summed. The parallel filter representation will be identical to the original if each coefficient $b_n$ is left unchanged in one filter and set to zero in the other. These two parallel filters will be referred to as the post main-path filter and the pre main-path filter. The coefficients $b_n$, for n<0 are set to zero in the post main-path filter and the coefficients $b_n$, for n≧0 are set to zero in the pre main-path filter. Doing this produces the parallel filter representation of the ISI equivalent filter shown in FIG. 10.

Due to the nature of the channel, the post main-path filter is a minimum phase filter (all zeros inside the unit circle). Therefore, the reciprocal of its system function will have its poles inside the unit circle and be stable. Since the reciprocal of any system function is its equalizer, the system function for the equalizer of the post main-path filter is $$H_{post\_equ}(z) = \frac{G}{b_0 + b_1 z^{-1} + b_2 z^{-2} \ldots} \quad (1)$$

The coefficients for this IIR filter are $$\frac{b_1}{b_0}, \frac{b_2}{b_0}, \ldots$$

The computation load for getting the coefficients consists of computing the reciprocal $1/b_0$, which is the reciprocal of a complex number, and then performing one complex multiply per coefficient. The reciprocal can be found using successive approximation, which requires 1 complex multiply per bit of resolution.

The equalizer given by (1) is a perfect equalizer for the post main-path of the ISI equivalent reverse channel. This equalizer, which has poles and therefore is a feedback equalizer, has an infinite impulse response. However, the application of interest requires a feed forward equalizer, which is a finite impulse response filter. The appropriate length for this filter depends on many factors. To be a perfect equalizer it should have infinite length, but that is not practical. Another practical issue is the length of registers. Finite register lengths cause roundoff noise that increases with the length of the filter. There are engineering trade offs to be made. However the length of the feed forward equalizer is a factor in inter-operability of the modem and so is made part of the standard governing the application. Normally the length of the registers is left to the discretion of the design engineer.

Clearly, initializing a feed forward adaptive equalizer with its steady state values will immediately put it in steady state. This would reduce its convergence time to zero. The convergence time will not be zero if the equalizer is initialized with coefficients different from the steady state values. However, the convergence time will be reduced if the initialized values of the coefficients are close to the steady state values.

The length of the feed forward equalizer used in the application of interest is 24. However, most of the work is done by three or four taps. If these three or four taps (coefficients) are initialized with values close to their steady state values, then the stochastic decent algorithm will converge faster. The problem is to find estimates of the main tap weights of a feed forward equalizer with a reasonable amount of circuitry. The approach taken to estimate the taps is to find an equalizer of length 4 for the post-main path ISI equivalent. The criterion is to force the main-path output sample to 1 and the following three samples to zero when the input to the ISI equivalent is an impulse at n=0. Ideally, to remove all of the ISI, the output for all samples except the first should be zero. However, with an equalizer of length 4, only three samples can be forced to zero.

The problem is simplified by removing the pre main-path ISI equivalent and considering a system where the post main-path ISI equivalent is followed by the equalizer. The equalizer has 4 coefficients denoted $\alpha_n$ with n=0, 1, 2, 3. If the post-main path ISI equivalent filter is excited with an impulse at n=0, then the output of the equalizer is $$\xi_n = \sum_{k=0}^{n} b_k \alpha_{n-k}$$

The values of $\alpha_n$ are chosen to make $\xi_0=1$ and $\xi_1=\xi_2=\xi_3=0$. This produces the following set of equations $$b_0 \alpha_0 = 1$$

$$b_0 \alpha_1 + b_1 \alpha_0 = 0$$

$$b_0 \alpha_2 + b_1 \alpha_1 + b_2 \alpha_0 = 0$$

$$b_0 \alpha_3 + b_1 \alpha_2 + b_2 \alpha_1 + b_3 \alpha_0 = 0$$

The simultaneous solutions to this set of equations are $$\alpha_0 = 1/b_0$$

$$\alpha_1 = -b_1/b_0^2$$

$$\alpha_2 = -b_2/b_0^2 + b_1^2/b_0^3$$

$$\alpha_3 = -b_3/b_0^2 + 2b_1 b_2/b_0^3 - b_1^3/b_0^4$$

Figure 11:
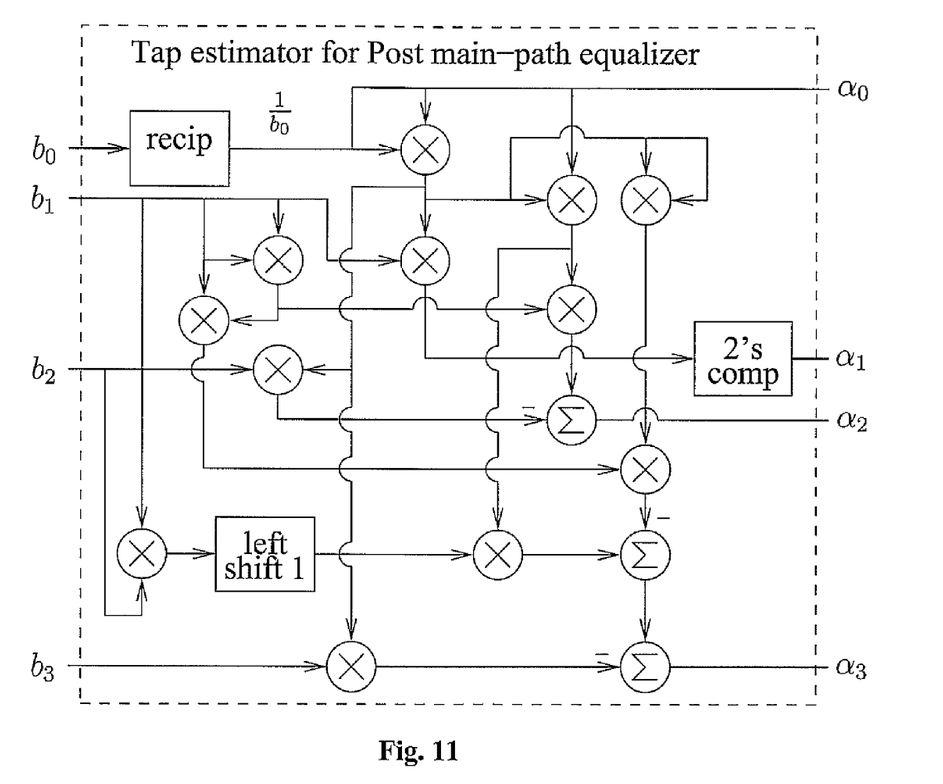
FIG. 11 is a block diagram showing a first embodiment of the circuit for generating estimates of the most influential coefficients of the Equalizer.

The circuit that generates the equalizer coefficients from the ISI equivalent filter coefficients is shown in FIG. 11. The computational requirement is very modest—one reciprocal calculation and 12 complex multiplies.

Figure 12:
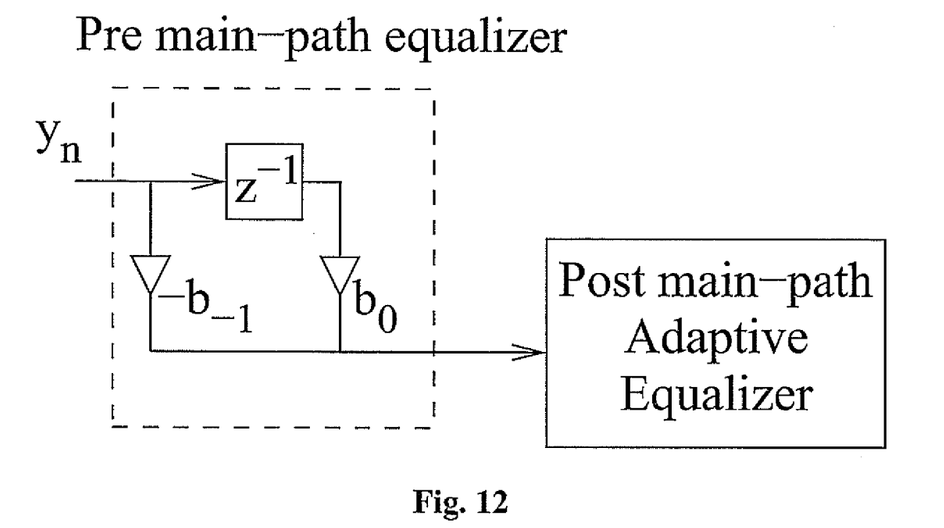
FIG. 12 is a block diagram showing a cascaded equalizer structure which compensates for pre main-path ISI.

When the pre main-path ISI equivalent is included in the ISI equivalent filter, things change. The impulse response of the cascade of the ISI equivalent filter and an equalizer constructed using the above technique will not be zero for n=1 or for n=2 or for n=3. This is due to the fact that the output of the pre main-path filter gets spread into those samples by the equalizer. The equalizer can be extended in order to reduce this spreading. To explain this, consider the extended equalizer to be the cascade of two equalizers, as shown in FIG. 12. The first equalizer, which follows the ISI equivalent filter, is a simple two tap non-adaptive filter. The second equalizer is the adaptive equalizer discussed previously, the structure of which is shown in FIG. 6.

The first equalizer is constructed such that when it is in cascade with the ISI equivalent filter, the first pre main-path coefficient of the resulting impulse response is zero. In order to achieve this goal, the coefficients of the length-two pre main-path equalizer must be $TAP_0=-b_{-1}$ and $TAP_1=b_0$. By cancelling out the ISI caused by the first pre main-path coefficient of the ISI equivalent filter, the simple pre main-path equalizer allows the adaptive equalizer to converge more quickly.

Figure 13:
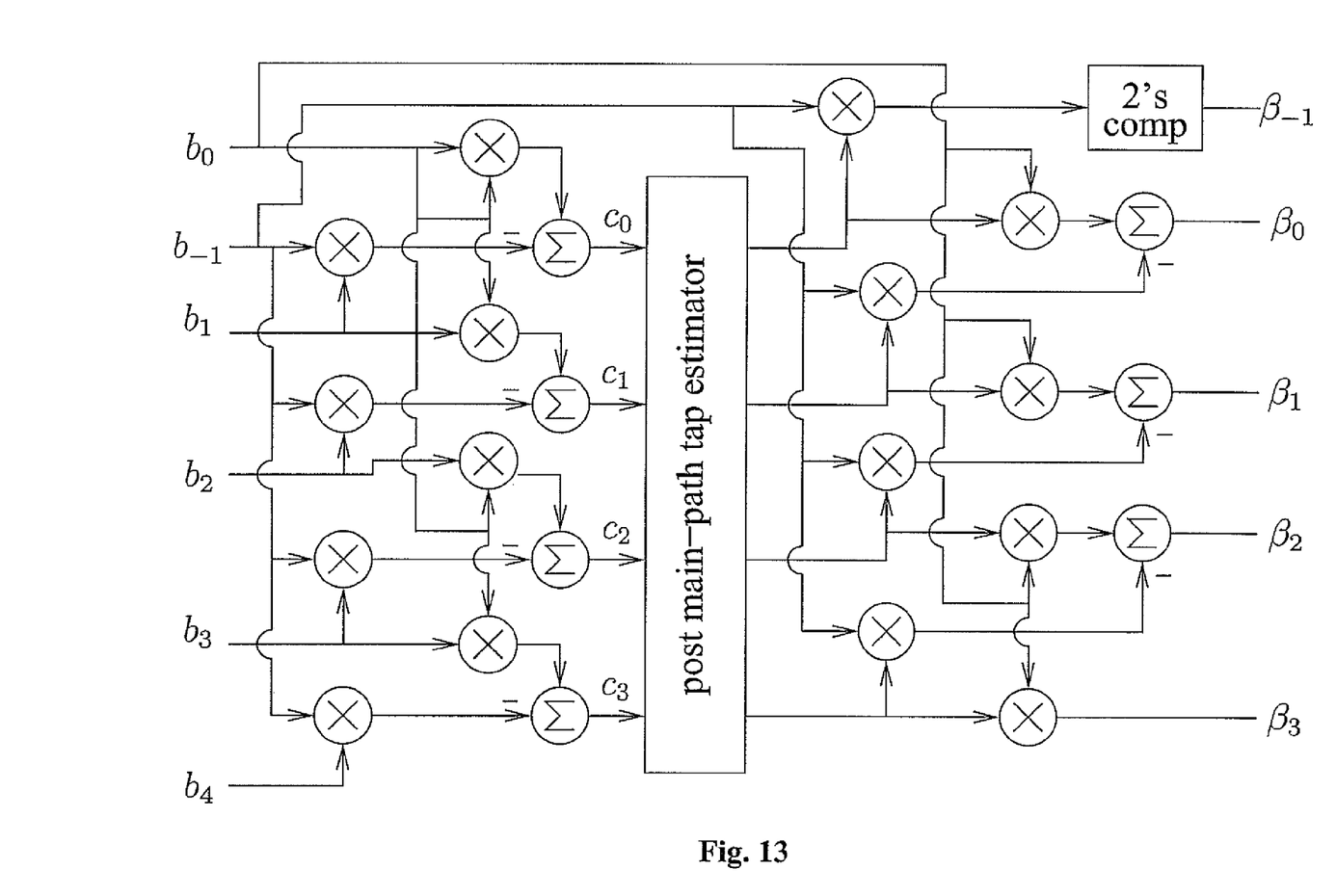
FIG. 13 is a block diagram showing a second embodiment of the circuit for generating estimates of the most influential coefficients of the Equalizer.

The input to the second equalizer is the output of the first equalizer. This input can also be considered the output of the partially equalized ISI equivalent reverse channel. The partially equalized ISI equivalent can itself be viewed as an ISI equivalent of an RF channel, in this case the partially equalized reverse channel. The coefficients for the ISI equivalent of this partially equalized reverse channel are given by the convolution of the impulse responses of the original ISI equivalent filter and the two tap equalizer, which are given by $$c_n = b_n - b_{-1}b_{n+1},$$

where $c_n$ are the coefficients of the ISI equivalent of the partially equalized reverse channel and $c_0$ is the first coefficient of the post main path component of two filters in cascade. The initialization coefficients for the second equalizer can be calculated from the equations for $\alpha_n$ with coefficients $c_n$ substituted for $b_n$. This will increase the computational load by 4 complex multiplies to make the total 16. The cascade of the two equalizers is an equalizer with 5 coefficients, which are given by the convolution of the two filters. This convolution requires another 4 complex multiplies so total computation load is a complex reciprocal, which is $1/b_0$ and 20 complex multiplies. The circuit that calculates the coefficients for the enhanced equalizer is shown in FIG. 13. The coefficients for the so-called enhanced equalizer are denoted $\beta_n$.

Performance Analysis of the Estimator for ISI Equivalent Coefficients

An estimator for the coefficients of the ISI equivalent reverse channel is described in the preceding section. The ISI equivalent reverse channel is a post matched filter model of the reverse channel. The input to the ISI equivalent filter is the output of the matched filter. The matched filter is sampled once per symbol at the correct decision time. This input can be viewed as the sequence of decision variables if the system were pristine.

For this analysis, without loss of generality, the ISI equivalent filter is treated as a non-causal filter of length $2L+1$, where L is a constant. The coefficients are denoted by $\{b_{-L}, b_{-L+1}, \ldots, b_0, \ldots, b_L\}$. The coefficients are treated as fixed, but unknown constants. They are not treated as observations of random variables and therefore the performance is not tied to a loss function that defends on a joint probability density function.

This filter is excited with the sequence of pristine decision variables of length $4L+2$, denoted by $\{x_{-L}, x_{-L+1}, \ldots, x_{3L+1}\}$. Since the origin of the pristine decision variables is in the preamble, this sequence is known. A major part of the strategy for estimating the channel coefficients is choosing the preamble to yield a set of pristine decision variables that are $x_j=1$ for j from $-L$ to $3L+1$ except for $j=L+1$. For $j=L+1$, the value of $x_j$ is $-1$, i.e. $x_{L+1}=-1$. By the nature of a pristine system, the pristine decision variables are the same as the values of the preamble. Thus the preamble has length $4L+2$, with the first $2L+1$ values being 1, followed by a single $-1$ followed by another $2L$ values of 1.

From this model, the received signal, which includes the effects of both the Johnson noise and the channel, is given by $$y_j = n_j + \sum_{k=-L}^{L} b_k x_{j-k}; \quad 0 \le j \le 2L+1$$

where $n_j$ is the noise corrupting output $y_j$. The noise $n_j$ is Johnson noise filtered by the matched filter and sampled at the decision times. Noise $n_j$ is an observation of random variable $n_j$, which has variance $N_o R_s/2$, where $N_o$ is the one sided spectral density of the Johnson noise and $R_s$ is the symbol rate.

An estimate of channel coefficient $b_j$ is obtained by $$\hat{b}_j = (y_0 - y_{j+L+1})/2 \quad -L \le j \le L$$

If the noise is treated as a random variable then so should the output of the matched filter. In which case $y_j$ is an observation of random variable $y_j$ and $\hat{b}_j$ is an estimate from estimator $\hat{b}_j$. With the random variable notation, the estimator is given by $$\hat{b}_j = (y_0 - y_{j+L+1})/2, \quad -L \le j \le L \qquad (2)$$

The mean of this estimator is given by, $$E\{\hat{b}_j\} = E\left\{\frac{y_0 - y_{j+L+1}}{2}\right\} \qquad (3)$$

$$= E\left\{\left(\sum_{k=-L}^{L} b_k + n_0 - \sum_{k=-L}^{L} b_k + 2 \times b_j - n_{j+L+1}\right)/2\right\}$$

$$= b_j$$

So the variance is calculated by, $$E\{|\hat{b}_j - E\{\hat{b}_j\}|^2\} = E\{|(y_0 - y_{j+L+1})/2 - b_j|^2\} \qquad (4)$$

$$= E\left\{\left|\frac{\sum_{k=-L}^{L} b_k + n_0 - \sum_{k=-L}^{L} b_k + 2 \times b_j - n_{j+L+1}}{2} - b_j\right|^2\right\}$$

$$= E\left\{\left|\frac{n_0 - n_{j+L+1}}{2}\right|^2\right\}$$

$$= \frac{N_o R_s}{8} + \frac{N_o R_s}{8}$$

$$= \frac{N_o R_s}{4}$$

However, if the length of the ISI equivalent reverse channel is more than $2L+1$, the expressions for the mean and variance are not valid. In such a case, symbols on either side of the $4L+2$ in the preamble will affect $y_j$ and thereby change the estimate of the coefficients $b_j$. The correct equation to use for $y_j$ is $y_j = \sum_{k=-\infty}^{\infty} b_k x_{j-k} + n_j$; $0 \le j \le 2L+1$, which allows for the ISI equivalent reverse channel to be of infinite length.

The objective of estimating the channel and then using this information to seed the equalizer is to shorten the preamble, which will increase the system throughput. To this end it is prudent to estimate only the coefficients of the ISI equivalent that have significant weights with a sequence of $x_j$ that is as short as possible, as the length of the preamble is extended by one, for each $x_j$. To analyse a system where the excitation sequence is shorter than necessary to estimate all the coefficients in the ISI equivalent, the symbols in the preamble on either side of the "symbols used to generate the set of $x_j$'s" are treated as noise. The model for the ISI equivalent channel is an FIR filter of infinite length, however, the intent is to estimate the 2L+1 of them centered on the largest coefficient using the same excitation sequence in the preamble, i.e. the same set of $x_j$, $-2L \leq j \leq 2L+1$. With the longer ISI equivalent and a preamble that has a relatively large number of symbols on each side of the portion of the preamble that is used to excite the channel, it is reasonable to express $y_0$ with $$y_0 = \sum_{k=-L}^{L} b_k - b_{-L-1} + \sum_{k=-\infty}^{-L-2} b_k x_{-k} + \sum_{k=L+1}^{\infty} b_k x_{-k} + n_0 \quad (5)$$

$$= \sum_{k=-L}^{L} b_k - b_{-L-1} + \sum_{k=-3L-1}^{-L-2} b_k + \sum_{k=-\infty}^{-3L-2} b_k x_{-k} + \sum_{k=L+1}^{\infty} b_k x_{-k} + n_0$$

The analysis that follows is not exhaustive. It intended to give an appreciation for the effects of a excitation sequence that has been shortened for the sake of efficiency. The mean and variance are derived for just one coefficient, which is $\hat{b}_{-L}$. That result is used to give insight into how symbols surrounding the "channel excitation" portion of the preamble affect the other coefficients.

The estimate for $b_{-L}$, requires expressions for both $y_0$ and $y_1$. The expression for $y_0$ is given above. The expression for $y_1$ is $$y_1 = \sum_{k=-L}^{L} b_k - 2 \times b_{-L} + \sum_{k=-\infty}^{-L-1} b_k x_{1-k} + \sum_{k=L+1}^{\infty} b_k x_{1-k} + n_1 \quad (6)$$

$$= \sum_{k=-L}^{L} b_k - 2 \times b_{-L} + \sum_{k=-3L}^{-L-1} b_k + \sum_{k=-\infty}^{-3L-1} b_k x_{1-k} + b_{L+1} + \sum_{k=L+2}^{\infty} b_k x_{1-k} + n_1.$$

The mean of the estimator for coefficient $b_{-L}$ is given by $$E\{\hat{b}_{-L}\} = E\left\{\frac{y_0 - y_1}{2}\right\} \quad (7)$$

$$= E\left\{b_{-L} - b_{-L-1} + \frac{b_{-3L-1} - b_{L+1}}{2}\right\} +$$

$$E\left\{\left(\frac{-b_{-3L-1} \times_{3L+2} + b_{L+1} \times_{-L-1}}{2}\right)\right\} +$$

$$E\left\{\left(\frac{\sum_{k=-\infty}^{-3L-2} b_k(x_{-k} - x_{1-k}) + \sum_{k=L+2}^{\infty} b_k(x_{-k} - x_{1-k})}{2}\right)\right\} +$$

$$E\left\{\frac{n_0 - n_1}{2}\right\},$$

where, for the purposes of this analysis, $x_{3L+2}$ and $x_{-L-1}$ are treated as random variables as they are generated from symbols outside the "channel excitation" portion of the preamble and are unknown to the channel estimator. In practice, at the end of the day, they would be known, but chosen with other objectives in mind, so from the point of view of the channel estimator, it reasonable to treat them as random variables. Further to this, it is reasonable to assume $E[x_{3L+2}]$ and $E[x_{-L-T}]$ are zero. In which case the equation above reduces to $$E\{\hat{b}_{-L}\} = b_{-L} - b_{-L-1} + \frac{b_{-3L-1} - b_{L+1}}{2}$$

It is necessary to make two more assumptions in order to derive an expression for the variance of $\hat{b}_{-L}$. It is assumed that $E\{|x_j|^2\}=1$ and $E\{x_j x_k\}=0$; $j \neq k$, for all j and k outside the "channel excitation" portion or the preamble. Under these assumptions, the variance of the estimator for tap $b_{-L}$ is, $$E\{|\hat{b}_{-L} - E\{\hat{b}_{-L}\}|^2\} = E\left\{\left|\frac{y_0 - y_1}{2} - \left(\frac{b_{-L} - b_{-L-1} + b_{-3L-1} - b_{L+1}}{2}\right)\right|^2\right\} \quad (8)$$

$$= E\left\{\left|\frac{-b_{-3L-1} x_{3L+2} + b_{L+1} x_{-L-1}}{2}\right|^2\right\} +$$

$$E\left\{\left|\frac{\sum_{k=-\infty}^{-3L-2} b_k(x_{-k} - x_{1-k})}{2}\right|^2\right\} +$$

$$E\left\{\left|\frac{\sum_{k=L+2}^{\infty} b_k(x_{-k} - x_{1-k})}{2}\right|^2\right\} +$$

$$E\left\{\left|\frac{n_0 - n_1}{2}\right|\right\}$$

$$= \sum_{k=-\infty}^{-3L-2} |b_k|^2 + \sum_{k=L+2}^{\infty} |b_k|^2 + \frac{|b_{L+1}|^2}{4} + \frac{|b_{-3L+1}|^2}{4} + \frac{N_o R_s}{4}$$

The estimators for the other ISI equivalent coefficients will have different expressions for their mean and variance as all of them have some terms that depends on their position. Based on the expressions for the mean and variance of $\hat{b}_{-L}$, it is clear that estimators become biased and the variances become larger if the ISI equivalent is longer than that of the filter the "channel excitation" portion of the preamble is designed to estimate. It is also reasonable to conclude that providing the total energy in coefficients for $j<-L$ and $j>L$ is considerable less than $N_o R_s/4$, there will not be significant degradation. A rule of thumb for choosing L, which determines the length of the "channel excitation" portion of the preamble, is to make L large enough so that $\Sigma_{j=L+1}^{\infty} |b_j|^2 < N_o R_s/2$.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. In a radio frequency (RF) signal transmission network for transferring symbols comprising:
    an RF transmission medium for transmitting the symbols modulated to a transmission format;
    and at least one adaptive equalizer for filtering inter-symbol interference (ISI) in the transmitted signals, the adaptive equalizer having a series of coefficients for which values are required;
    a method for initializing the adaptive equalizer coefficients comprising:
    using a parallel filter structure to construct a model of the transmission channel so as to decompose the model of the transmission channel into two segments, each of which is represented by a single FIR filter, thereby modeling the ISI seen at the receiver as two symbol-rate FIR filters connected in a parallel configuration;

transmitting a signal preamble including symbols arranged such that the required equalizer coefficients can be calculated;

wherein both the channel model and the equalizer are both represented with only a single sample per symbol;

wherein the calculation is arranged to calculate coefficients b for the ISI equivalent model;

and wherein the calculation includes using a circuit to effect calculation of the required equalizer coefficients from the coefficients b for the ISI equivalent model.

2. The method according to claim 1 wherein, in order to calculate an initial estimate of the equalizer coefficients, all the b-minuses are set to zero.

3. The method according to claim 2 wherein the initial equalizer coefficients are calculated such that they cancel any ISI created by the ISI equivalent model coefficients $b_1$, $b_2$, and $b_3$.

4. The method according to claim 1 wherein, in order to calculate an initial estimate of the equalizer coefficients, all the b-minuses except $b_{-1}$ are set to zero.

5. The method according to claim 4 wherein, the initial equalizer coefficients are calculated such that they cancel any ISI created by the ISI equivalent model coefficients $b_{-1}$, $b_1$, $b_2$, and $b_3$.

6. The method according to claim 1 wherein the circuit is arranged to calculate an inversion of $b_0$ only once.

7. The method according to claim 1 wherein the circuit is arranged to calculate the coefficients by a long division process.

8. The method according to claim 1 where the network is a coaxial cable network.

9. The method according to claim 1 wherein the equalizer is pre-transmit equalizer arranged to operate on the signal to pre-equalize.

10. The method according to claim 1 wherein the equalizer is post-transmit equalizer arranged to operate on the signal after transmission.

11. In a radio frequency (RF) signal transmission network for transferring symbols comprising:

an RF transmission medium for transmitting the symbols modulated to a transmission format;

and at least one adaptive equalizer for filtering inter-symbol (ISI) interference in the transmitted signals, the adaptive equalizer having a series of coefficients for which values are required;

a method for initializing the adaptive equalizer coefficients comprising:

modeling the ISI seen at the receiver as two symbol-rate FIR filters connected in a parallel configuration;

transmitting a signal preamble including symbols arranged such that the required equalizer coefficients can be calculated;

and from the preamble effecting a calculation algorithm by which the equalizer coefficients are calculated;

wherein the preamble includes the sequence set forth in Table 1;

wherein the calculation is effected using a deconvolution process to calculate coefficients b for the ISI equivalent model and wherein the calculation includes using a circuit to effect calculation of the required equalizer coefficients from the coefficients b for the ISI equivalent model.

12. The method according to claim 11 wherein, in order to calculate an initial estimate of the equalizer coefficients, all the b-minuses are set to zero.

13. The method according to claim 12 wherein the initial equalizer coefficients are calculated such that they cancel any ISI created by the ISI equivalent model coefficients $b_1$, $b_2$, and $b_3$.

14. The method according to claim 11 wherein, in order to calculate an initial estimate of the equalizer coefficients, all the b-minuses except $b_{-1}$ are set to zero.

15. The method according to claim 14 wherein, the initial equalizer coefficients are calculated such that they cancel any ISI created by the ISI equivalent model coefficients $b_{-1}$, $b_1$, $b_2$, and $b_3$.

16. The method according to claim 11 wherein the ISI equivalent model coefficients are calculated using the following equations:

$$b_{-3} = (\psi_3 - \psi_4)/2$$
$$b_{-2} = (\psi_3 - \psi_5)/2$$
$$\vdots$$
$$b_k = (\psi_3 - \psi_{k+7})/2$$

where the variable $\psi_i$ is defined as the ith output of the ISI equivalent model in response to the signal preamble.

17. The method according to claim 11 wherein the ISI equivalent model coefficients are calculated using the following equations:

$$b_{-3} = \left(\sum_{i=4}^{10} \psi_i/10\right) - \psi_4/2$$
$$b_{-2} = \left(\sum_{i=4}^{10} \psi_i/10\right) - \psi_5/2$$
$$\vdots$$
$$b_k = \left(\sum_{i=4}^{10} \psi_i/10\right) - \psi_{k+7}/2$$

where the variable $\psi_i$ is defined as the ith output of the ISI equivalent model in response to the signal preamble 18. The method according to claim 11 where the network is a coaxial cable network.

19. The method according to claim 11 wherein the equalizer is pre-transmit equalizer arranged to operate on the signal to pre-equalize.

20. The method according to claim 11 wherein the equalizer is post-transmit equalizer arranged to operate on the signal after transmission.

21. The method according to claim 11 wherein the circuit is arranged to calculate an inversion of $b_0$ only once.

22. The method according to claim 11 wherein the circuit is arranged to calculate the coefficients by a long division process.

* * * * *